United States Patent

Drake

[15] 3,675,183

[45] July 4, 1972

[54] TELEPHONE CORD TERMINAL BLOCK

[72] Inventor: King B. Drake, Los Angeles, Calif.

[73] Assignee: Dracon Industries, Chatsworth, Calif.

[22] Filed: Aug. 3, 1970

[21] Appl. No.: 60,370

[52] U.S. Cl. ....................339/103 R, 339/123 R, 339/198 C
[51] Int. Cl. ....................H01r 13/58, H01r 9/00
[58] Field of Search ....................174/54, 55, 56, 66, 67; 339/103, 119 R, 122, 123, 125 R, 126 R, 132 R, 132 B, 197, 198 R, 198 C, 198 J

[56] References Cited

UNITED STATES PATENTS 2,247,646 7/1941 Terry ....................339/198 J
1,568,584 1/1926 Blankenship ....................339/122

FOREIGN PATENTS OR APPLICATIONS 116,236 11/1936 Great Britain ....................339/197 R

*Primary Examiner*—Marvin A. Champion
*Assistant Examiner*—Lawrence J. Staab
*Attorney*—Allan M. Shapiro

[57] ABSTRACT

The terminal block joins the interconnecting cable and the telephone cord in a recessed receptacle box in the wall. The terminal block has a binding post for each wire in the telephone cord, and corresponding wires in the interconnecting cable. The terminal block has a central hole, between the terminal posts, for entry of the telephone cord to the terminal posts. The terminal block can be positioned directly beneath the receptacle cover plate, or may be integrally formed therewith.

8 Claims, 5 Drawing Figures

INVENTOR
KING B. DRAKE
BY Allan M. Shapiro
ATTORNEY

TELEPHONE CORD TERMINAL BLOCK

BACKGROUND OF THE INVENTION

1. Field of the Invention

This invention is in the telephone arts, and particularly relates to terminal blocks for terminating the cord on a telephone set and joining it to the interconnecting telephone cable at a wall box.

2. Description of the Prior Art

In modern homes and offices, the interconnecting telephone cable terminates in recessed receptacle boxes wherever a telephone may be desired. In the past, when it was desired that a telephone be connected to such an interconnecting cable, the interconnection was loosely made inside of the recessed receptacle, and a cover plate was employed to cover the wire joint. No convenient securement could be provided for strain relief of the telephone cord-interconnecting cable juncture, for the recessed receptacles and the cover plate were unequipped for such strain relief. Thus, any pull on the telephone cord pulled the joining points against the back of the cover plate. Such is unsatisfactory for long life and trouble-free operation. Furthermore, since the juncture points were not tied to specific terminal posts, they could touch together to cause short circuiting. This required the employment of insulating tape, which is far from fully satisfactory. One attempted solution of some of the problems has been to employ a terminal block to opposite sides of which cable and cord connections are made, with the block freely suspended in air in the receptacle and dangling therefrom when the cover plate is removed, thus presenting numerous difficulties in manipulation and assembly.

SUMMARY OF THE INVENTION

In order to aid in the understanding of this invention, it can be stated in essentially summary form that it is directed to a terminal block for providing a joining terminus between an interconnecting telephone cable and a telephone cord. The terminal block comprises terminal posts spaced around a substantially central opening, with a strain relief fastening means adjacent thereto. The terminal block is provided with means by which it can be secured to a receptacle box and the terminal block is provided with an opening through which a telephone cord can enter to terminate on the terminal posts. In one configuration, the terminal block is separate from but securable to the cover plate and, in another, it is formed as part of the cover plate.

Accordingly, it is an object of this invention to provide a telephone terminal block where the terminal block can be conveniently secured to a receptacle box, so that a juncture between a telephone cord and an interconnecting cable can be made in the receptacle box. It is a further object to provide a telephone cord terminal block which has a strain relief fastening means thereon so that the telephone cord can be provided with strain relief. It is still another object to employ a terminal block which has a sufficient number of terminal posts for interconnecting a cable and a telephone cord and which serves as at least a partial covering means for a receptacle box into which the terminal posts extend. It is still another object to form a terminal block as a part of a receptacle box cover plate so that securing the cover plate onto the receptacle box protects the terminals and the wire junction from contact with other structure which would cause electrical contact. It is another object to provide a telephone terminal block which can provide for quickly made good electrical connections which are protected and secure between the telephone cord and the interconnecting cable in the wall of a building by providing the terminal block at a recessed receptacle box in the wall.

The features of the present invention which are believed to be novel are set forth with particularity in the appended claims. The present invention, both as to its organization and manner of operation, together with further objects and advantages thereof, may be understood best by reference to the following description, taken in connection with the accompanying drawings.

DESCRIPTION OF THE PREFERRED EMBODIMENTS

Figures 1, 2, 3, 4, 5:
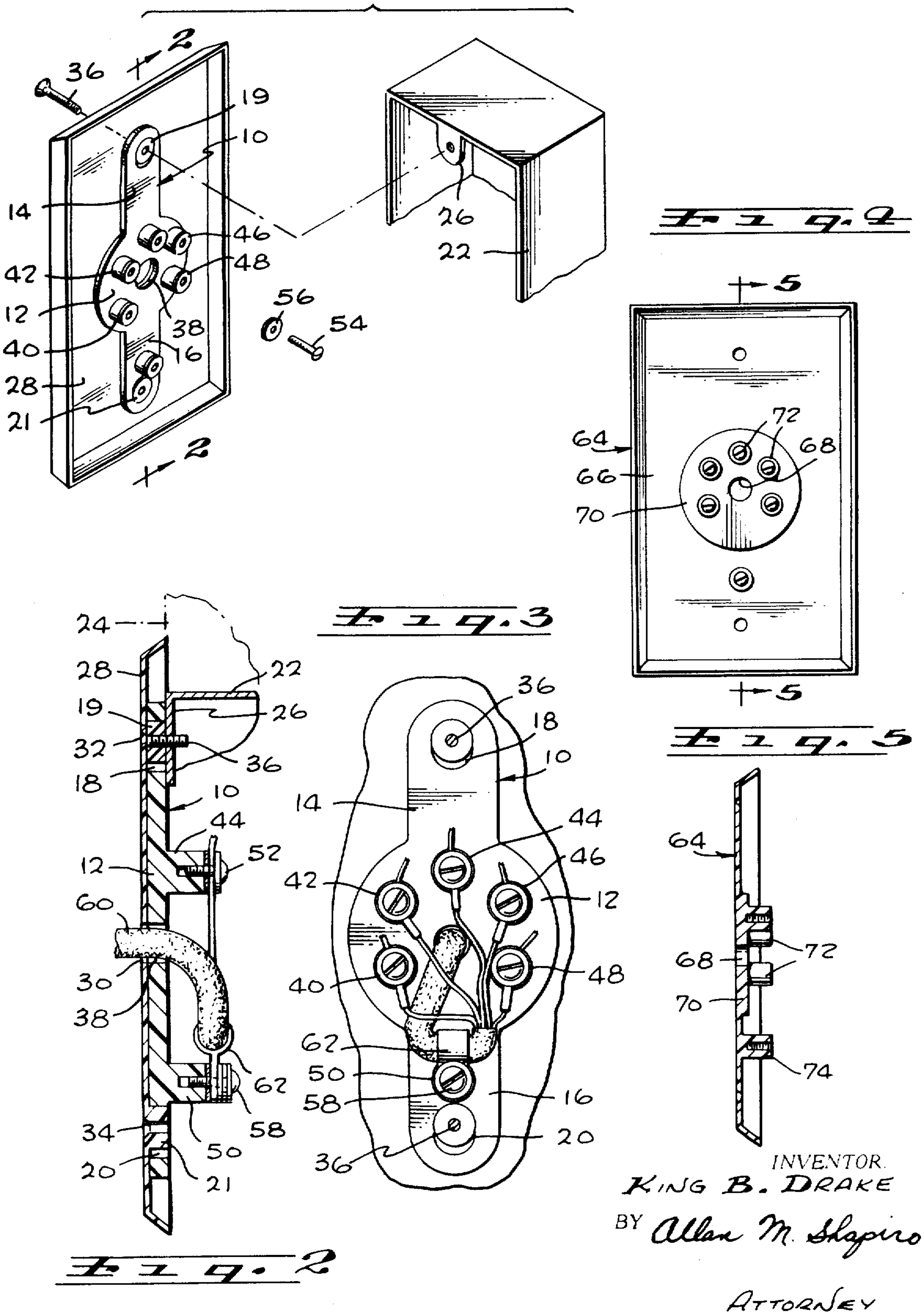
FIG. 1 is an exploded perspective view, with parts broken away, showing the terminal block of this invention in its first and preferred embodiment.
FIG. 2 is an enlarged section taken generally along the line 2—2 of FIG. 1, with a telephone cord connected.
FIG. 3 is a rear elevational view, generally as seen from the right of FIG. 2.
FIG. 4 is a rear elevational view of the second embodiment of the terminal block of this invention.
FIG. 5 is a section taken generally along the line 5—5 of FIG. 4.

The terminal block of this invention, in its preferred embodiment, is generally indicated at 10 in FIGS. 1, 2, and 3. The terminal block 10 comprises a substantially circular central section 12 which has securing ears 14 and 16 extending therefrom. The securing ears 14 and 16, respectively, have holes 18 and 20 therethrough, near their outer terminus, by which the terminal block 10 may be secured in place.

The terminal block 10 is employed in conjunction with a standard receptacle box 22. In conventional practice, the receptacle box 22 is recessed in a wall 24, in a home or office building. The receptacle box 22 has flanges 26 for cover securement purposes. Cover plate 28 has a central hole 30 therein and has securing screw holes 32 and 34 therethrough. Screws, for example screws 36, shown in FIGS. 1 and 2, extend through the cover plate holes, through the holes in the securing ears, and engage in threaded holes in the flanges 26 to secure the terminal block 10 and cover plate 28 on the receptacle box. As is seen in FIG. 2, the terminal block has its ears clamped securely between the cover plate and the flanges of the receptacle box. The holes 18 and 20 are larger than necessary for the screws 36. They are sufficiently large to accept locating bosses 19 and 21 conventionally molded on the inside of conventional cover plate 28 but, importantly, in press-fit engagement therewith along the sides so that terminal block 10 is effectively secured to cover plate 28 and retained thereby merely via bosses 19 and 21 and ears 14 and 16. Holes 18 and 20 are slightly elongated so that terminal block 10 can be moved longitudinally with respect to the cover plate to accommodate variations in location of bosses 19 and 21 on conventional cover plates.

Terminal block 10 has a central hole 38 in the center of central circular section 12. Terminal block 10 is located with respect to the cover plate so that the hole 30 in the cover plate is in alignment with the central hole 38 in the terminal block.

Terminal posts 40, 42, 44, 46 and 48 are arranged around central hole 38. Strain relief post 50 is located on securing ear 16. Each of the posts is integrally molded with the circular central section and securing ears of the terminal block, so that an economic synthetic polymer composition molded product can be easily made. The nature of the synthetic polymer composition material of which the terminal block 10 is molded is electrically insulative so that the terminal posts need no further structural details to provide electrical isolation. Each of the terminal posts, and the strain relief post 50, has a threaded hole therein. Each of the terminal posts has a terminal screw therein, of which terminal screws 52 and 54 are examples. There is preferably at least one washer 56 under the terminal screw to prevent screw tightening torques from being transferred to the wire under the terminal screw head. Furthermore, strain relief post 50 has a securing screw 58 therein, again preferably equipped with a washer.

As indicated in FIGS. 2 and 3, the telephone cord 60 is brought from the subscriber's set to the recessed receptacle box 22, where the telephone cord is to be interconnected with a telephone cable in the box 22 in the wall. Telephone cord 60 is brought through the hole 30 in the cover plate and central hole 38 in the terminal block. The telephone cord is brought adjacent strain relief post 50 and clamp strap 62 is wrapped therearound. Clamp strap 62 has two holes, both of which are engaged by securing screw 58 so that, upon tightening of the screw 58, the strap 62 is tightly engaged around telephone cord 60. This provides strain relief for telephone cord 60 so that, when the cord 60 is pulled, all strain is transferred directly to terminal block 10 through the strain relief post, rather than through the terminal posts.

Beyond the point where it is clamped, the individual wires in the telephone cord 60 have their ends stripped and bent under the washers of the terminal screws of the various terminals. Similarly, the interconnecting cable (not shown) has its wire ends stripped and engaged on the terminal screws. By this means, an interconnection is made between a wire in the telephone cord with a wire in the interconnecting cable at each of the terminal posts.

Another embodiment of the terminal block of this invention is generally indicated at 64 in FIGS. 4 and 5. As will be clear, terminal block 64 is an integrally formed combination of the terminal block 10 and the cover plate 28 previously described. Thus, cover plate portion 66 is of such dimension and has suitable securing screw holes to permit the cover plate 66 to engage over and cover the opening of a recessed receptacle box, such as 22 in FIG. 1.

Terminal block 64 has a central hole 68 for the entry of a telephone cord. Circular central section 70 is integrally molded with cover plate portion 66. Circular central section 70 has a thickened boss-like shape for strength and integrally carries five terminal posts as at 72, each of which has a suitable terminal screw. Furthermore, strain relief post 74 is integrally molded with the cover plate portion 66 adjacent the circular central section 70.

Terminal block 64 is employed in the same way as terminal block 10, together with its cover plate 28. The telephone cord is brought in through central hole 68, is secured at strain relief post 74, the individual wires are connected to wires from an interconnecting cable at each of the terminal posts 72, and secured by terminal screws, as previously described. Thus, either embodiment of the terminal block of this invention provides for economic and convenient interconnections, without danger of strain tearing apart a wire interconnection, and without danger of touching uninsulated wires in different circuits or grounded members. Further, maintenance and repair services are more readily accomplished than previously because removal of the cover plate from the wall box immediately exposes all wire connections in a single plane and physically secure location since the serviceman need merely hold the cover plate in one hand or place it on the floor for total access to the terminal connector block.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A telephone terminal connector block for connection between a telephone cord and an interconnecting cable in a receptacle box, said terminal block comprising:
a central section having a hole therethrough for the passage of the telephone cord;
a plurality of terminal posts on said central section, with at least one terminal post for each wire in a telephone cord to be interconnected;
a strain relief post adjacent said terminal post for the mounting of strain relief means thereon for connection to the telephone cord to prevent strain thereof;
said central section, said terminal post, and said strain relief post being integrally molded of electrically insulative synthetic polymer composition material;
a cover plate having a pair of screw holes for receiving securing screws therethrough and into a wall receptacle box, said cover plate having a pair of respective bosses surrounding said screw holes; and
said central section having first and second securing ears integrally formed therewith and extending oppositely therefrom, said securing ears having holes therein engaging around said bosses in press-fit engagement so that the securing screws will pass through said screw holes and securing holes into the wall receptacle box to secure said cover plate and said terminal block with respect to the wall receptacle box.

2. The terminal block of claim 1 wherein said strain relief post and said terminal posts have holes therein, said hole in said strain relief post being for reception of a securing screw and said holes in said terminal posts being for reception of terminal screws.

3. The terminal block of claim 2 wherein said central section is substantially circular and said telephone cord opening is substantially centrally located through said central section.

4. The terminal block of claim 3 wherein said terminal posts are located around said circular central section at substantially equal radii with respect to said central opening.

5. A telephone terminal connector block for connection between a telephone cord and an interconnecting cable in a receptacle box, said terminal block comprising:
a substantially circular central section having a substantially centrally located hole therethrough for the passage of the telephone cord;
a plurality of terminal posts on said central section, said terminal posts being located around said circular central section at substantially equal radii with respect to said central opening, there being one terminal post for each wire in a telephone cord to be interconnected, and a hole in each of said terminal posts for the reception of a terminal screw;
a strain relief post adjacent said terminal posts, and a hole in said strain relief post for the reception of a securing screw for the mounting of strain relief means thereon for connection of a telephone cord to prevent strain thereof;
said central section, said terminal posts and said strain relief post being integrally molded of electrically insulative synthetic polymer composition material;
a cover plate having a pair of screw holes for receiving securing screws therethrough and into a wall receptacle box, and bosses respectively surrounding said screw holes;
said substantially circular central section having first and second securing ears integrally formed therewith and extending oppositely therefrom, said securing ears having holes therethrough, with said holes in said securing ears surrounding said cover plate bosses in press-fit engagement therewith so that securing screws will pass through said screw holes and securing ears holes into the wall receptacle box to secure said cover plate and said terminal block with respect to the wall receptacle box.

6. The telephone terminal connector block of claim 5 wherein said cover plate has edges lying substantially in a plane for engagement against a wall, and said cover plate has its back recessed away from said plane, said ears and said bosses substantially equalling the depth of said cover plate recess so that said securing ears and said bosses lie substantially in said plane.

7. The telephone terminal connector block of claim 6 wherein said holes in said securing ears are elongated in the direction generally in alignment between said securing screws so that said terminal block has limited adjustability with respect to said cover plate.

8. The telephone terminal connector block of claim 5 wherein said holes in said securing ears are elongated in the direction generally in alignment between said securing screws so that said terminal block has limited adjustability with respect to said cover plate.

* * * * *